US012068569B2

(12) United States Patent
Haspel et al.

(10) Patent No.: US 12,068,569 B2
(45) Date of Patent: Aug. 20, 2024

(54) ARRANGEMENT, TOOL AND METHOD FOR PRODUCING SUCH AN ARRANGEMENT

(71) Applicant: TE Connectivity Germany GmbH, Bensheim (DE)

(72) Inventors: Michael Haspel, Bensheim (DE); Uwe Bluemmel, Bensheim (DE); Erik Glombitza, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/153,429

(22) Filed: Jan. 20, 2021

(65) Prior Publication Data

US 2021/0226355 A1 Jul. 22, 2021

(30) Foreign Application Priority Data

Jan. 20, 2020 (DE) ......................... 102020101236.5

(51) Int. Cl.
*H01R 9/05* (2006.01)
*H01R 4/18* (2006.01)
(Continued)

(52) U.S. Cl.
CPC ............. *H01R 9/0518* (2013.01); *H01R 4/18* (2013.01); *H01R 4/70* (2013.01); *H01R 43/048* (2013.01)

(58) Field of Classification Search
CPC ... H01R 9/0518; H01R 13/6592; H01R 24/38
See application file for complete search history.

(56) References Cited

U.S. PATENT DOCUMENTS 6,015,953 A * 1/2000 Tosaka ..................... H01R 4/20 174/79
D460,947 S * 7/2002 Montena ...................... D13/154
(Continued)

FOREIGN PATENT DOCUMENTS

DE 10343837 B3 6/2005
EP 3588680 A1 1/2020
WO 2011102536 A1 8/2011

OTHER PUBLICATIONS

Extended European Search Report in Appln. No. 21152475.6-1201, dated Jun. 9, 2021, 11 pp.
(Continued)

*Primary Examiner* — Chau N Nguyen
(74) *Attorney, Agent, or Firm* — Barley Snyder

(57) ABSTRACT

An arrangement includes an electric cable having a first electric conductor and a contact device having a crimp barrel and a contact element mechanically and electrically connected to the crimp barrel. The crimp barrel extends along an axis and has a first inner circumferential side and a first outer circumferential side. A first impress and a second impress are stamped into a first sub-portion of the crimp barrel, the second impress is offset circumferentially from the first impress with respect to the axis. The first inner circumferential side is shaped by the first impress and the second impress in such a manner that the first inner circumferential side is pressed against a second outer circumferential side of the first electric conductor and electrically contacts the second outer circumferential side, with the first inner circumferential side fitting against the second outer circumferential side.

18 Claims, 11 Drawing Sheets

(51) Int. Cl.

| | |
|---|---|
| ***H01R 4/70*** | (2006.01) |
| ***H01R 43/048*** | (2006.01) |

(56) References Cited

U.S. PATENT DOCUMENTS

| | | | | |
|---|---|---|---|---|
| 6,805,596 | B2 * | 10/2004 | Quesnel ................. | H01R 11/09 29/862 |
| 7,268,297 | B2 * | 9/2007 | Jeong ..................... | H01R 4/489 174/75 C |
| 9,246,282 | B1 * | 1/2016 | Sovel ....................... | H01R 9/05 |
| 9,472,901 | B2 * | 10/2016 | Wang ................. | H01R 13/6593 |
| D919,391 | S * | 5/2021 | Jefferson, Jr. .................. | D8/107 |
| 2010/0000788 | A1 * | 1/2010 | Kawase ............... | H01R 9/0509 29/747 |
| 2012/0122329 | A1 * | 5/2012 | Montena .............. | H01R 9/0524 439/271 |
| 2012/0240380 | A1 * | 9/2012 | Babej .................... | F16B 37/062 411/181 |
| 2015/0064992 | A1 * | 3/2015 | Kato .................... | H01R 9/0524 439/879 |
| 2018/0175518 | A1 | 6/2018 | Mori et al. | |

OTHER PUBLICATIONS

Abstract of DE10343837, dated Jun. 9, 2005, 1p.

Angelica Pajkovic, "To Crimp or to Swage?, Hose & Coupling World", <https://hose-coupling-world.com/to-crimp-or-to-swage/> (Aug. 11, 2021), 6 pages, (Jun. 27, 2023).

Michelle Difrangia, "Choosing between crimping and swaging, Swaging versus Crimping: What is the difference?", <https://www.hoseassemblytips.com/choosing-between-crimping-and-swaging/> (Feb. 1, 2016) (Jun. 27, 2023), 10 pages.

Michelle Difrangia, "Swaging & Crimping: What's the Difference? Swaging vs. Crimping", <https://www.fenn-torin.com/swaging-crimping-whats-the-difference/>, (Aug. 5, 2020) 3 pages (Jun. 27, 2023).

Michelle Difrangia, "What is a Swaging Tool?", <https://monroeaerospace.com/blog/what-is-a-swaging-tool>, (May 23, 2022), (Jun. 27, 2023) 4 pages.

Wikipedia, Spline (mechanical), downloaded Jan. 10, 2024, 4 pages (https://en.wikipedia.org/w/index.php?title=Spline_(mechanical)&oldid=1191010712).

* cited by examiner

ARRANGEMENT, TOOL AND METHOD FOR PRODUCING SUCH AN ARRANGEMENT

CROSS-REFERENCE TO RELATED APPLICATION

This application claims the benefit of the filing date under 35 U.S.C. § 119(a)-(d) of German Patent Application No. 102020101236.5, filed on Jan. 20, 2020.

FIELD OF THE INVENTION

The present invention relates to a contact element and, more particularly, to a contact element connected to an electric cable.

BACKGROUND

There are numerous known designs of contact elements that are connected to an electric conductor of an electric cable by a crimp contact. In crimping, a part of the contact element is pressed into the electric cable and, in the process, the electric conductor is displaced, or possibly damaged, by the shaped-in part of the contact element.

SUMMARY

An arrangement includes an electric cable having a first electric conductor and a contact device having a crimp barrel and a contact element mechanically and electrically connected to the crimp barrel. The crimp barrel extends along an axis and has a first inner circumferential side and a first outer circumferential side. A first impress and a second impress are stamped into a first sub-portion of the crimp barrel, the second impress is offset circumferentially from the first impress with respect to the axis. The first inner circumferential side is shaped by the first impress and the second impress in such a manner that the first inner circumferential side is pressed against a second outer circumferential side of the first electric conductor and electrically contacts the second outer circumferential side, with the first inner circumferential side fitting against the second outer circumferential side.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

Figure 1:
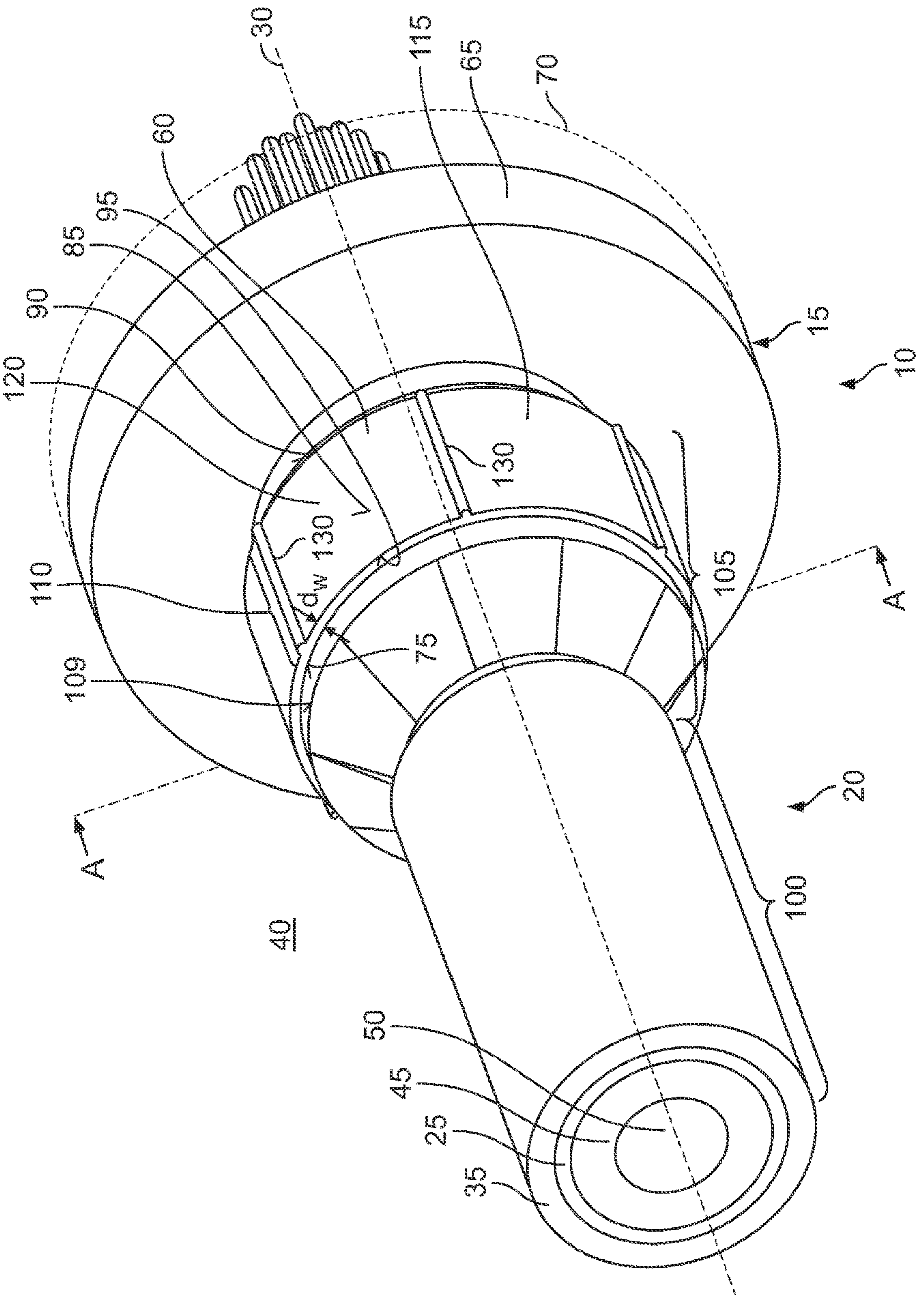
FIG. 1 is a perspective view of an arrangement according to a first embodiment.

An arrangement 10 according to a first embodiment is shown in FIG. 1. The arrangement 10 has a contact device 15 and an electric cable 20.

The electric cable 20 shown in FIG. 1 is realized, exemplarily, as a shielded cable. The electric cable 20 has a first electric conductor 25. The first electric conductor 25 may be realized as a shield, or outer conductor. The first electric conductor 25 extends along an axis 30. The first electric conductor 25 in this case is realized approximately as a hollow cylinder with respect to the axis 30. The first electric conductor 25 in this case may have a wire braid, which is formed of a fine or ultrafine wire. The wire braid may be woven or be composed of individual wires running parallel to axis 30.

To aid understanding, the arrangement 10 is described in the following on the basis of a cylindrical coordinate system relative to the axis 30.

The first electric conductor 25 is sheathed radially on the outside by a sheathing 35, as shown in FIG. 1. The first sheathing 35 is made of an electrically insulating first material and electrically insulates the first electric conductor 25 from an environment 40. The sheathing 35, in an embodiment, completely encloses the first electric conductor 25 on a circumference of the first electric conductor 25.

Radially on an inside, the electric cable 20 has, for example, an electrically insulating intermediate layer 45 as shown in FIG. 1. In the embodiment, the electrically insulating intermediate layer 45 is encompassed circumferentially by the first electric conductor 25. Radially on the inside of the intermediate layer 45, the electric cable 20 has, for example, a second electric conductor 50.

The second electric conductor 50 may be formed from a single wire. The second electric conductor 50 may also be formed from a bundle of wires, for example fine or ultrafine wires. The second electric conductor 50 may also be termed an inner conductor. The second electric conductor 50 may be used, for example, to transmit a data signal. In this case, an electric current to be transmitted is less than 1A. The second electric conductor 50 may also be designed for the transmission of electric energy, for example to supply power to an electric motor. In an embodiment, for this purpose the second electric conductor 50 has a cross-sectional area of at least 2 $mm^2$, such as 5 $mm^2$, in another embodiment at least 10 $mm^2$, and in another embodiment at least 25 $mm^2$. The second electric conductor 50 may be designed, for example, such that the cross-sectional area of the second electric conductor 50 is less than or equal to 200 $mm^2$, less than or equal to 100 $mm^2$, less than or equal to 50 $mm^2$.

The first electric conductor 25 and/or the second electric conductor 50 comprise/comprises an electrically conductive second material, copper and/or aluminum and/or gold and/or silver in an embodiment. The first electric conductor 25 and the second electric conductor 50 may comprise the same material or a different material.

The intermediate layer 45 shown in FIG. 1 electrically insulates the second electric conductor 50 from the first electric conductor 25. In the embodiment, the first electric conductor 25 is designed to electromagnetically shield the second electric conductor 50 from the environment 40. In particular, the first electric conductor 25 is intended to prevent a large electric current (for example 100A) transmitted by the second electric conductor 50 from generating an electromagnetic field which would interfere with other electrical devices in the vicinity of the electric cable 20. The first electric conductor 25 thus improves the electromagnetic compatibility of the arrangement 10.

The contact device 15 has a crimp barrel 60 and a contact element 65 that is connected to the crimp barrel 60, as shown in FIG. 1. The crimp barrel 60 and the contact element 65 are arranged directly next to each other with respect to axis 30. The crimp barrel 60 is realized in its basic shape, for example, as a hollow cylindrical with respect to the axis 30, and extends along the axis 30. The crimp barrel 60 comprises a third material, the third material being electrically conductive. The contact element 65 may likewise comprise the third material. The contact element 65 is also electrically conductive, and serves to realize an electrical contact to another contact element 70 (indicated by a broken line in FIG. 1).

With a first inner circumferential side 75, the crimp barrel 60 delimits a crimp receiver 80 on the inside. In the embodiment, the crimp barrel 60 is of a continuous design, in particular without gaps. This means that, in the embodiment, over the entire extent along the axis 30, the crimp barrel 60 has no slits or gaps that extend radially outwards from the first inner circumferential side 75 to a first outer circumferential side 85 of the crimp barrel 60. In an embodiment, the first inner circumferential side 75 is shaped substantially with a circular cross-section with respect to the axis 30.

The crimp barrel 60 additionally has a first end face 90 and a second end face 95 as shown in FIG. 1, the first end face 90 being arranged on a side of the crimp barrel 60 that faces towards contact element 65, and the second end face 95 on a side of the crimp barrel 60 that faces away from contact element 65. The first and the second end face 90, 95 are substantially perpendicular to the axis 30 and have a substantially annular basic shape in plan view. The first end face 90 in this case is offset from the second end face 95 in the direction of the axis 30.

The electric cable 20 has a sheathed portion 100 and a stripped portion 105 as shown in FIG. 1, the electric cable 20 in the sheathed portion 100 being realized as described above. In the stripped portion 105, the sheathing 35 has been removed from the first electric conductor 25, such that radially on the outside the first electric conductor 25 is electrically contactable and is not protected by the first sheathing 35. The first electric conductor 25 has a second outer circumferential side 109, which is freely contactable in the stripped portion 105.

When the contact device 15 is mounted on the electric cable 20, the crimp barrel 60 has at least one first impress 115 in a first sub-portion 110 and one second impress 120 that is offset in the circumferential direction from the first impress 115, as shown in FIG. 1. The first sub-portion 110 adjoins the second end face 95, for example in the direction of axis 30. The first sub-portion 110 may also be arranged at a distance from the second end face 95.

The first impress 115 and the second impress 120 are substantially identical in extent in the circumferential direction, but also in the direction of the axis 30. In FIG. 1, for example, the first impress 115 and/or the second impress 120 extend, in a direction parallel to the axis 30, substantially over an entire maximum extent of the crimp barrel 60.

Extending between the first impress 115 and the second impress 120 there is a protuberance 130 shown in FIG. 1, which is realized in the form of a rib. The protuberance 130 projects radially outwards beyond the first impress 115 and the second impress 120. The protuberance 130 is significantly narrower in the circumferential direction than the first impress 115 and/or the second impress 120. The crimp barrel 60 has a greater maximum thickness of material at the protuberance 130 in a radial direction than at the first impress 115 and/or the second impress 120.

Figure 2:
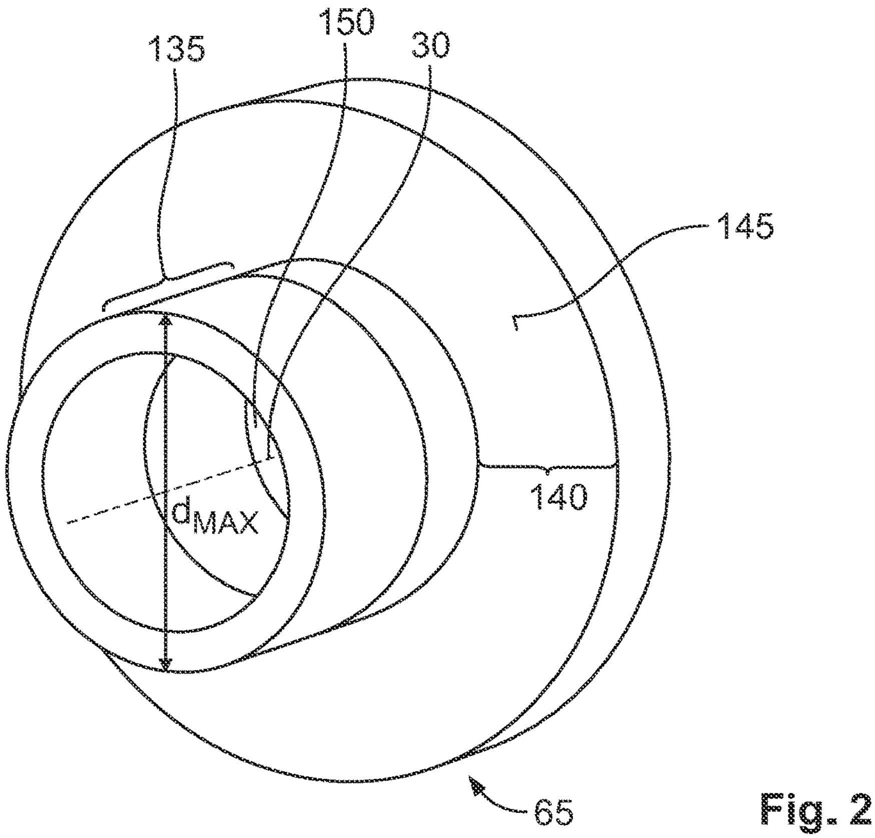
FIG. 2 is a perspective view of a contact element of the arrangement of FIG. 1.

The contact element 65, as shown in FIG. 2, has a connection portion 135 and a contact portion 140, the connection portion 135 adjoining the contact portion 140 in the direction of the axis 30. On a side that faces towards the connection portion 135, the contact portion 140 has a third end face 145 which is aligned perpendicularly in relation to the axis 30. The contact portion 140 in this case may extend radially outwards as an edge over the connection portion 135 and project radially beyond the connection portion 135. The connection portion 135 and the contact portion 140 are mechanically and electrically connected to each other. In an embodiment, the connection portion 135 and the contact portion 140 are made in one piece and of the same material.

As shown in FIG. 2, the connection portion 135 is realized, for example, as a hollow cylinder. On the inside, the contact element 65 has an opening 150 that extends through the entire contact element 65, along the axis 30. The axis 30 in this case is positioned centrally in relation to the opening 150.

The contact portion 140 is realized, for example, in the manner of a disc with respect to the axis 30. The contact portion 140 is represented only symbolically in FIG. 2, and serves to provide the contacting to the further contact element 70. The contact portion 140 may, for example, be of a design different from that shown in FIG. 2.

Figure 3:
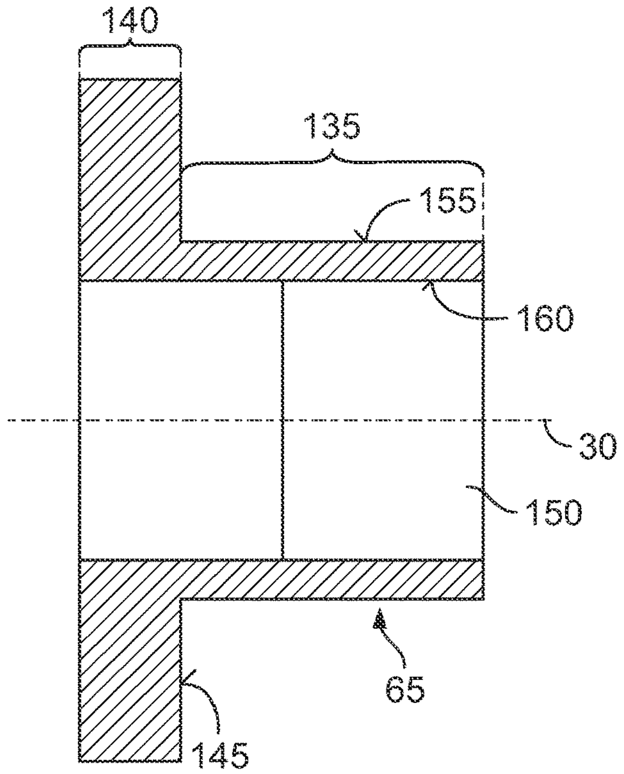
FIG. 3 is a sectional side view of the contact element of FIG. 2.

As shown in FIG. 3, the contact element 65 is, for example, rotationally symmetrical with respect to the axis 30. The connection portion 135 is made in one piece with and the same material as the contact portion 140 in an embodiment. Radially on the outside, the connection portion 135 has a third outer circumferential side 155, which is realized, for example, in the form of a cylinder around the axis 30. The connection portion 135 is longer than the crimp barrel 60 in a direction parallel to the axis.

Figure 4:
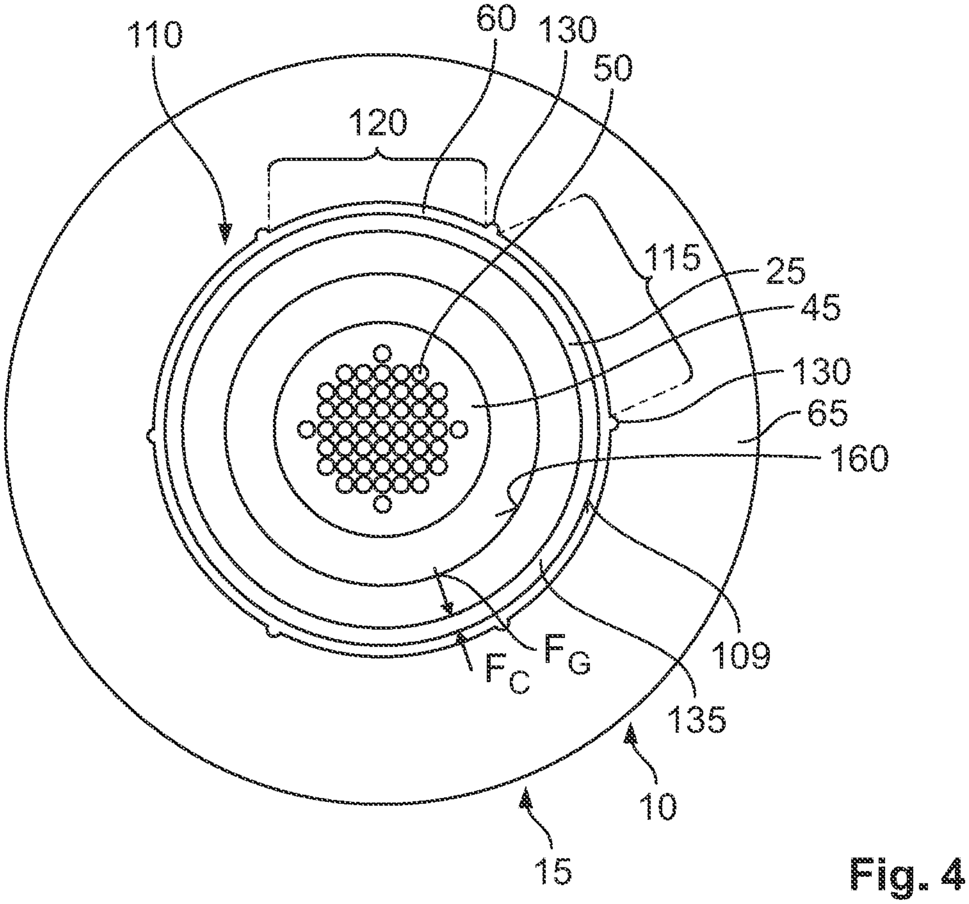
FIG. 4 is a sectional front view of the arrangement, taken along plane A-A of FIG. 1.

In an embodiment, as shown in FIG. 4, there are a plurality of first and second impresses 115, 120 stamped into the crimp barrel 60 on the first outer circumferential side 85. It is particularly advantageous in this case if the first impress 115 and/or the second impress 120 each extend/extends over a respective angular segment of about 20 to 60°, or 30 to 45°. The protuberance 130 is significantly narrower in the circumferential direction than the first impress 115 and/or the second impress 120. In the circumferential direction with respect to the axis 30, the protuberance 130 may extend over an angular segment of about 0.5° to 2°, or 0.7° to 1.5°.

In the embodiment of the arrangement 10 shown in FIG. 4, a plurality of first and second impresses 115, 120 of the crimp barrel 60 are provided in the circumferential direction. The first and second impresses 115, 120 are substantially identical to each other and have substantially an identical distance in the circumferential direction. The intermediate layer 45 is spaced apart radially from a second inner circumferential side 160 of the contact element 65. The second inner circumferential side 160 in this case delimits the opening 150 in the radial direction.

Figure 5:
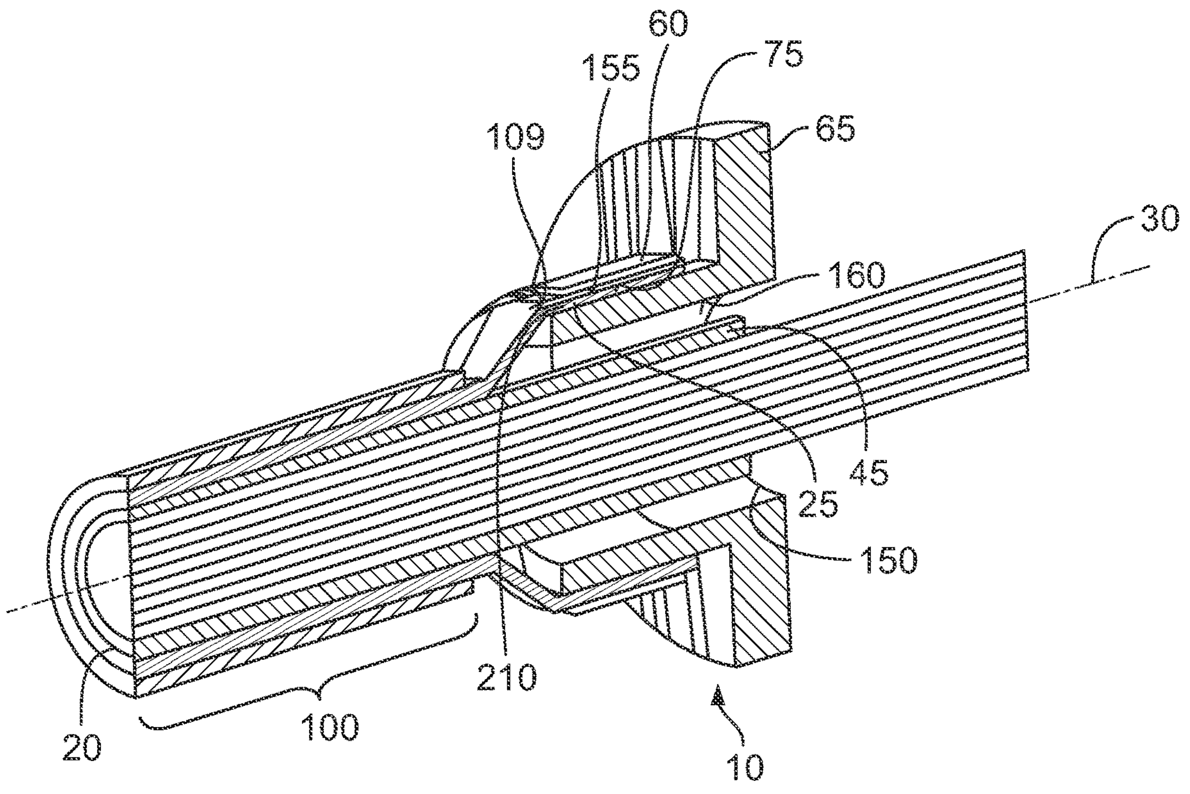
FIG. 5 is a sectional perspective view of the arrangement of FIG. 1.

As shown in FIG. 5, the crimp barrel 60, with its first inner circumferential side 75 together with the third outer circumferential side 155, forms an annular gap 210, the first electric conductor 25 being arranged in the annular gap 210. The first electric conductor 25 is thereby widened compared to the sheathed portion 100 of the cable 20. The first inner circumferential side 75 fits closely against the second outer circumferential side 109 of the first electric conductor 25.

When assembled, the realization of the first and second impress 115, 120 causes the crimp barrel 60 to be pressed, or crimped, onto the first electric conductor 25 in such a manner that the first inner circumferential side 75 lies substantially flatly against the second outer circumferential side 109 and fits closely against the second outer circumferential side 109, as shown in FIG. 5. As a result of the pressing of the first inner circumferential side 75 onto the second outer circumferential side 109, the crimp barrel 60 electrically contacts the first electric conductor 25. In addition, the first inner circumferential side 75 forms a frictional connection with the second outer circumferential side 109.

As a result of the pressing the crimp barrel 60 onto the first electric conductor 25, the first inner circumferential side 75 presses with a pressing force FC from radially outside to radially inside in the direction of the axis 30, as shown in FIG. 4. The pressing force FC in this case presses the first electric conductor 25, radially on the inside, onto the third outer circumferential side 155 of the connection portion 135 shown in FIG. 5. The connection portion 135 is designed to be pressure-stable in the radial direction and provides a counterforce FG shown in FIG. 4, corresponding to the pressing force FC, which acts against the pressing force FC from radially inside to radially outside. The counterforce FG supports the first electric conductor 25 radially inside. By the action of the pressing force FC and the counterforce FG, the first electric conductor 25 forms a frictional connection both radially inside with the connection portion 135 and radially outside with the first inner circumferential side 75 of the crimp barrel 60. Owing to the frictional connection, both the crimp barrel 60 and the first electric conductor 25 are frictionally connected to the connection portion 135.

The intermediate layer 45 and the second electric conductor 50 are routed through the opening 150 as shown in FIG. 5. The connection portion 135 shown in FIG. 4 protects them from being compressed.

Figure 6:
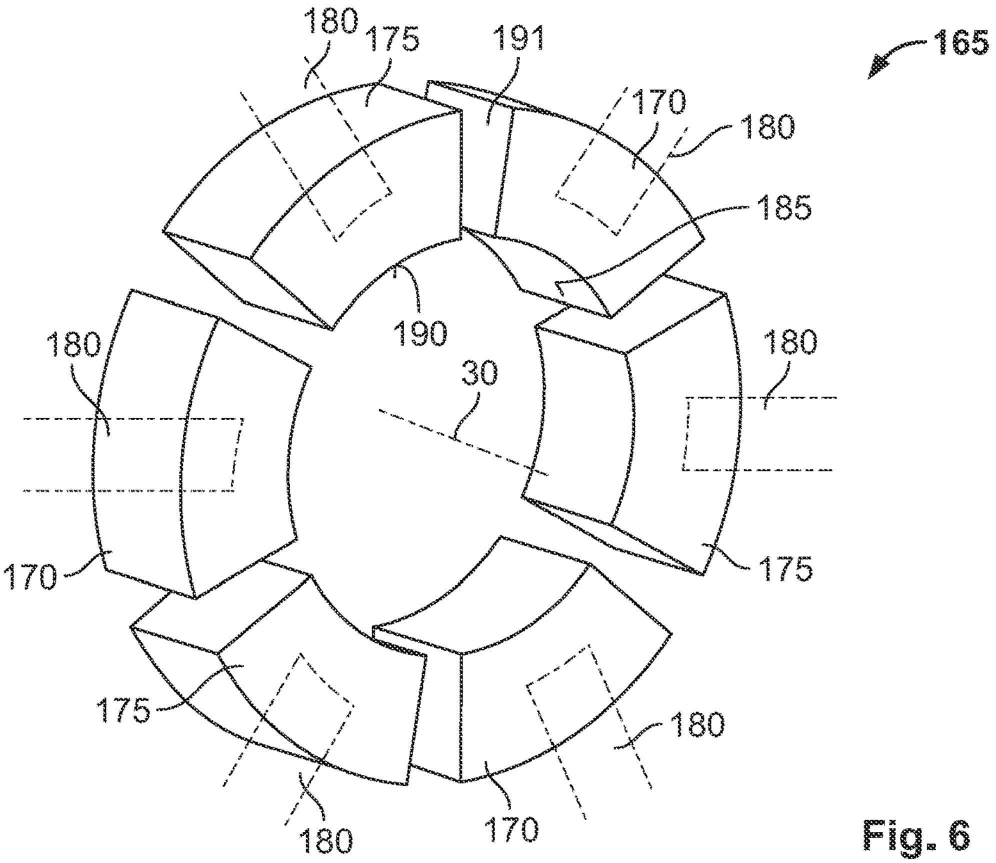
FIG. 6 is a perspective view of a tool for producing the arrangement of FIG. 1.
Figure 7:
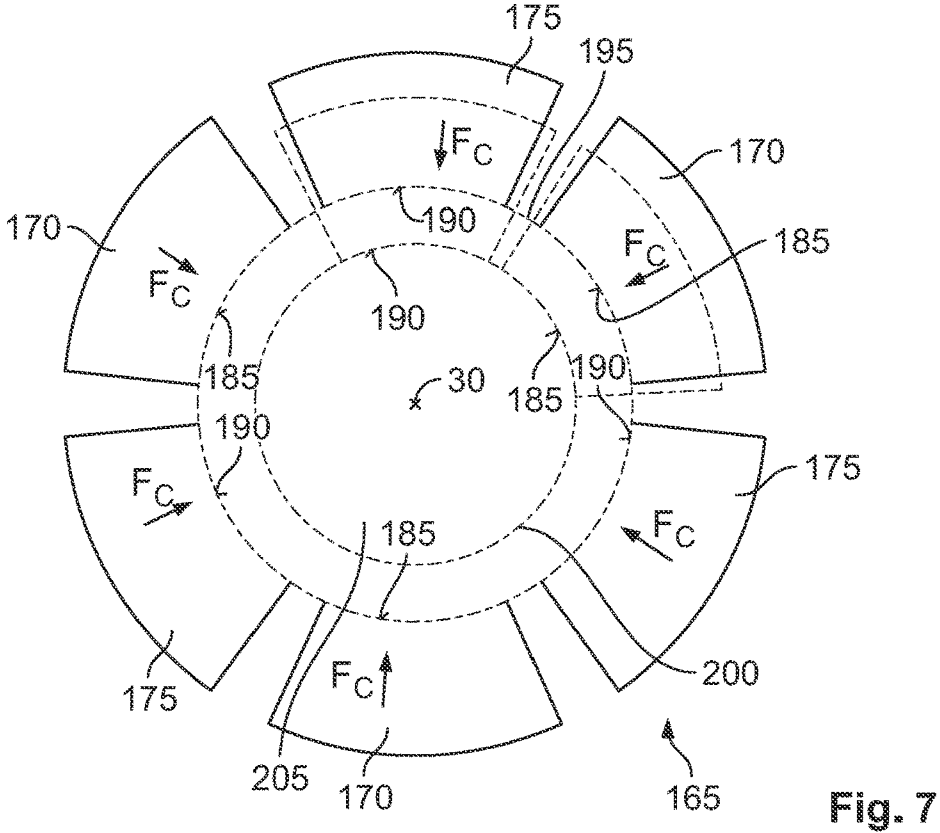
FIG. 7 is a front view of the tool of FIG. 6.

A tool 165 according to an embodiment is shown in FIGS. 6 and 7. The tool 165 is designed as a crimping tool and has at least one first pressing jaw 170 and at least one second pressing jaw 175 that is arranged in the circumferential direction with respect to the first pressing jaw 170. In an embodiment, the tool 165 has a plurality of pressing jaws 170, 175, which are arranged at a distance from each other in the circumferential direction. In addition, the tool 165 may have at least one guide element 180, the guide element 180 being represented only symbolically in FIG. 6. The guide element 180 is connected to each of the pressing jaws 170, 175.

The first pressing jaw 170 has a first pressing surface 185, as shown in FIG. 6. The first pressing surface 185 is located radially on an inside of the first pressing jaw 170 and extends on a cylinder segment around the axis 30. The second pressing jaw 175 has a second pressing surface 190, the second pressing surface 190 extending over another cylinder segment with respect to the axis 30.

In the embodiment shown in FIGS. 6 and 7, the tool 165 has, for example, six pressing jaws 170, 175, the pressing jaws 170, 175 being, for example, identical to each other in design. The pressing jaws 170, 175 in this case each extend over an equal angular segment with respect to the axis 30. The pressing jaws 170, 175 may also differ from each other in design. In the embodiment, the pressing jaws 170, 175 are arranged at a distance from each other in the circumferential direction, with a respective gap 191 extending between the first pressing jaw 170 and the second pressing jaw 175, the gap 191 extending, from radially inside, from the pressing surface 185, 190 to radially outside. The pressing jaws 170, 175 in this case are realized in such a manner, for example, that the gap 191 has substantially the same gap width in the circumferential direction with increasing radial distance from the axis 30. The gap width of gap 191 may also increase with increasing distance from the axis 30.

The first and/or second pressing surface 185, 190 have/has a first extent in the circumferential direction, the gap width of the gap 191 being less than the first extent. A ratio of the first extent to the gap width is, in an embodiment, in a range of from at least 1.5 to 10, in a range of from 2 to 9, or in a range of from 3 to 8.

The guide element 180 is designed to move the pressing jaws 170, 175 between a radially outer first position and a radially inner second position. In FIG. 7, a solid line shows the pressing jaws 170, 175 in the radially outer first position. The pressing surfaces 185, 190 are arranged on a common first circular path 195 in the first radially outer position. The pressing surfaces 185, 190 delimit a tool receiver 205 in the radial direction.

The guide 180 (not shown in FIG. 7 for reasons of clarity) can move the pressing jaws 170, 175 simultaneously and synchronously between the radially outer first position and the radially inner second position. The guide element 180 may comprise, for example, a link guide. The guide element 180 may also include hydraulically actuated elements and actuators that are designed to move the pressing jaws 170, 175 between the first radially outer position and the second radially inner position.

In the radially inner second position, indicated by dot-dash lines in FIG. 7, the first and second pressing surfaces 185, 190 are arranged together on a common second circular path 200 around the axis 30. The first circular path 195 and the second circular path 200 are concentric with the axis 30. If the pressing jaws 170, 175 are in the second radially inner position, the gap 191 is narrower in the circumferential direction than if the pressing jaws 170, 175 are in the radially outer first position.

Figure 8:
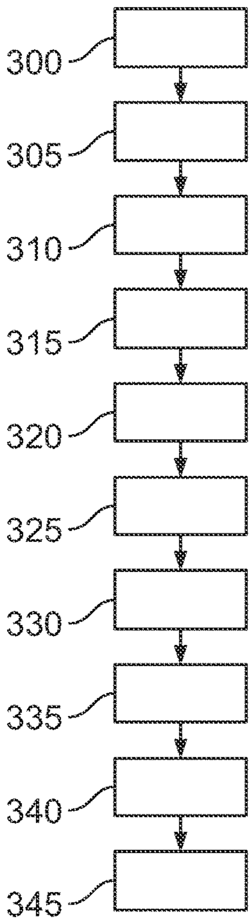
FIG. 8 is a flowchart of a method for producing the arrangement of FIG. 1 with the tool of FIG. 7.
Figure 9:
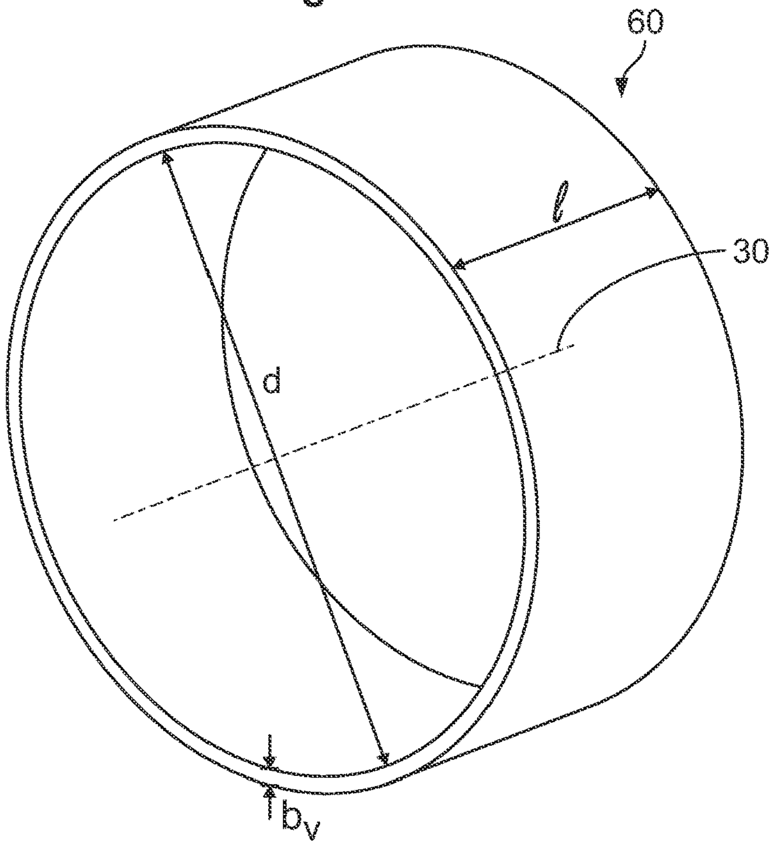
FIG. 9 is a perspective view of a crimp barrel during a third step of the method of FIG. 8.

FIG. 8 shows a flow diagram of a method for producing the arrangement 10 shown in FIGS. 1 to 6. FIG. 9 shows a perspective representation of the crimp barrel 60 during the third method step 310.

In a first method step 300, the pressing jaws 170, 175 are moved into the radially outer first position.

In a second method step 305 that follows the first method step 300, the electric cable 20, for example coming from a reel, is cut off and, directly after the cut, the sheathing 35 is removed from the first electric conductor 25 to realize the stripped portion 105.

In a third method step 310, the crimp barrel 60 and the contact element 65 are provided in an uncrimped state. In the uncrimped state, as shown in FIG. 9, the crimp barrel 60 is realized substantially as a hollow cylinder. The crimp barrel 60 in this case has a substantially constant thickness of material bv in the radial direction with respect to the axis 30. The crimp barrel 60 may be formed, for example, from a thin-walled material such as sheet metal. In the embodiment, an inner diameter d of the crimp barrel 60 is, for example, greater than an extent 1 along the axis 30. In the embodiment, the inner diameter d is selected so as to be greater than a maximum outer diameter $d_{MAX}$ of the connection portion 135.

In a fourth method step 320 that follows the third method step 310, the crimp barrel 60 is threaded onto the electric cable 20, or the electric cable 20 is inserted through the crimp barrel 60.

In a fifth method step 320 that follows the fourth method step 315, the first electric conductor 25 is, for example, widened out. This may be effected, for example, by a mandrel. In addition, the intermediate layer 45 and the second electric conductor 50 is inserted through the opening 150 in such a manner that the second electric conductor 50 and the intermediate layer 45 protrude on a side of the contact element 65 that faces away from the connection portion 135. The contact element 65 in this case is positioned in such a manner that the connection portion 135 engages radially between the intermediate layer 45 and the first electric conductor 25. The first electric conductor 25 encompasses the connection portion 135 radially on the outside and bears against the third outer circumferential side 155.

In a sixth method step 325 that follows the fifth method step 320, the crimp barrel 60 is pushed onto the connection portion 135 and onto the first electric conductor 25, which is arranged at the connection portion 135. The crimp barrel 60 in this case forms the annular gap 210 with the third outer circumferential side 155 (see FIG. 5), the widened-out first electric conductor 25 being arranged in the annular gap 210.

In a seventh method step 330 that follows the sixth method step 325, the arrangement 10 is positioned in the tool receiver 205 in such a manner that the pressing surfaces 185, 190 are positioned radially overlapping the crimp barrel 60. A radial overlap in this case is understood to mean that, when projected in a radial direction in a plane in which the axis 30 runs, the two components, for example the pressing jaws 170, 175 and the crimp barrel 60, overlap. Likewise, the pressing jaws 170, 175 have a radial overlap with the connection portion 135 and the widened-out first electric conductor 25 in the stripped portion 105. In the embodiment, the crimp barrel 60 and the pressing jaws 170, 175 have the same extent along axis 30. In this case the pressing jaws 170, 175 and the crimp barrel 60 are positioned in such a manner that they have a complete radial overlap.

In an eighth method step 335 that follows the seventh method step 330, the guide element 180 in each case introduces the radially inwardly directed pressing force $F_C$ into the pressing jaws 170, 175, as shown in FIG. 7. In addition, guide element 180 moves the pressing jaws 170, 175 from the radially outer first position to the radially inner second position. Each of the pressing jaws 170, 175 bears with the respective pressing surface 185, 190 flatly against the second outer circumferential side 109 of the crimp barrel 60. The connection portion 135 is stiffer than the crimp barrel 60. This is achieved in that a further wall thickness of the connection portion 135 is significantly greater (in an embodiment by a factor of from 1.5 to 10) than the wall thickness d of the crimp barrel 60.

Upon provision of the pressing force $F_C$, the connection portion 135 provides the counterforce $F_G$, which acts outwards in a radial direction, shown in FIG. 4. As a result of the pressing force $F_C$ being introduced into the crimp barrel 60, the crimp barrel 60 is pressed onto the first electric conductor 25 in such a manner that the first inner circumferential side 75 fits closely against the first outer circumferential side 85 of the first electric conductor 25 and lies substantially flatly against it. The first pressing surface 185 and the geometrical design of the first pressing jaw 170 cause the first impress 115 to be stamped into the first outer circumferential side 85 by the pressing force $F_C$. Similarly, the second pressing jaw 175 stamps the second impress 120 into the first outer circumferential side 85 by the second pressing surface 190. Similarly, the other pressing jaws 170, 175 shown in FIG. 7 respectively stamp the first and second impress 115, 120 into the first outer circumferential side 85 in such a manner that the first inner circumferential side 75 fits closely against the first outer circumferential side 85 of the first electric conductor 25, thereby substantially maintaining a circular form.

Upon stamping-in, part of the material of the crimp barrel 60 flows into each gap 191 and forms the respective protuberance 130. As a result, the crimp barrel 60 has different material thicknesses d in the circumferential direction, such that the material thickness dw radially inside the first and second impresses 115, 120 is less than at the protuberance 130. The stamping-in of the first and second impresses 115, 120 also has the advantage that the crimp barrel 60 is stiffened, thus preventing unwanted widening of the crimp barrel 60 after removal of the pressing jaws 170, 175. In addition, the crimp barrel 60 presses the first electric conductor 25 against the connection portion 135, such that the connection portion 135 together with the crimp barrel 60 frictionally secures the first electric conductor 25.

Due to the stamping-in of the first and second impresses 115, 120 and the associated reduction of the inner diameter d of the crimp barrel 60, in a ninth method step 340 that follows the eighth method step 335, the crimp barrel 60 maintains the pressing force $F_C$ at least partially even after the removal of the pressing jaws 170, 175, and consequently presses the first electric conductor 25 radially on the inside against the third outer circumferential side 155, such that the frictional connection still remains between the crimp barrel 60 and the first electric conductor 25, or the first electric conductor 25 and the connection portion 135.

The fact the first inner circumferential side 75 fits closely against the first electric conductor 25 prevents portions of the crimp barrel 60 from boring into the first electric conductor 25 when stamping the first and second impress 115, 120. On the contrary, following the stamping-in of the first and second impress 115, 120, the crimp barrel 60 still has a substantially cylindrical shape on the first inner circumferential side 75, but now with a reduced inner diameter d. This design has the advantage of avoiding damage to the first electric conductor 25 by stamping the crimp barrel 60. On the one hand, this ensures a particularly good electrical contact of the first electric conductor 25 with the connection portion 135, and on the other hand, a particularly good mechanical connection between the first electric conductor 25 and the contact device 15 is ensured, such that the arrangement 10 is particularly reliable and particularly durable even in the case of high vibration.

Because the first inner circumferential side 75 is substantially maintained relative to the basic shape of the crimp barrel 60, i.e. before crimping of the crimp barrel 60, or the first inner circumferential side 75 is reduced concentrically, the crimp barrel 60 has a particularly large contact surface to the first electric conductor 25. Furthermore, damage, for example shearing or cutting-off of individual wires of the first electric conductor 25, is avoided due to the close-fitting inner first circumferential side 75.

In a tenth method step 345 that follows the ninth method step 340, the second electric conductor 50 may be electrically contacted, for example, by an additional, further contact element 70 shown schematically in FIG. 1.

Figure 10:
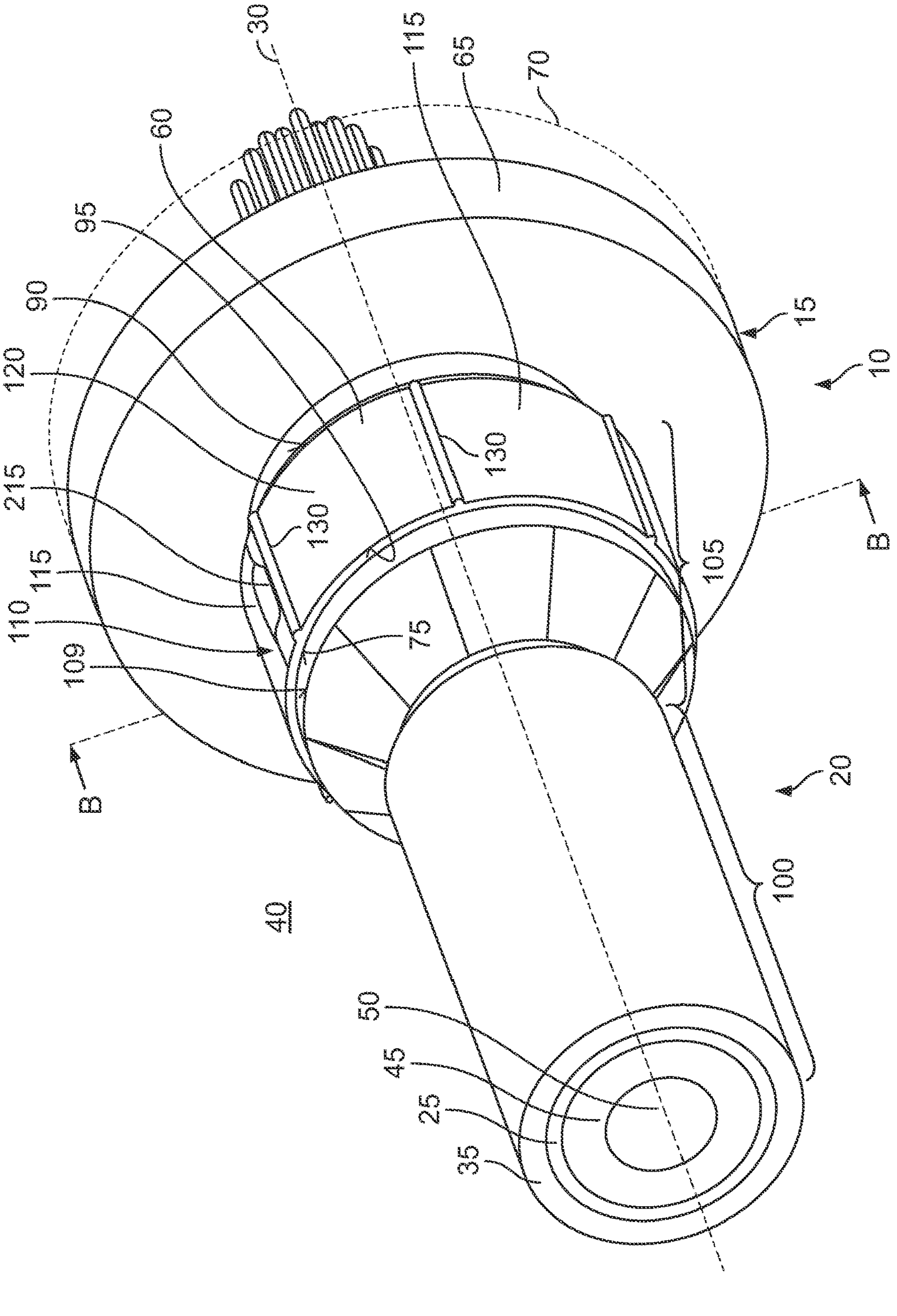
FIG. 10 is a perspective view of an arrangement according to a second embodiment.
Figure 11:
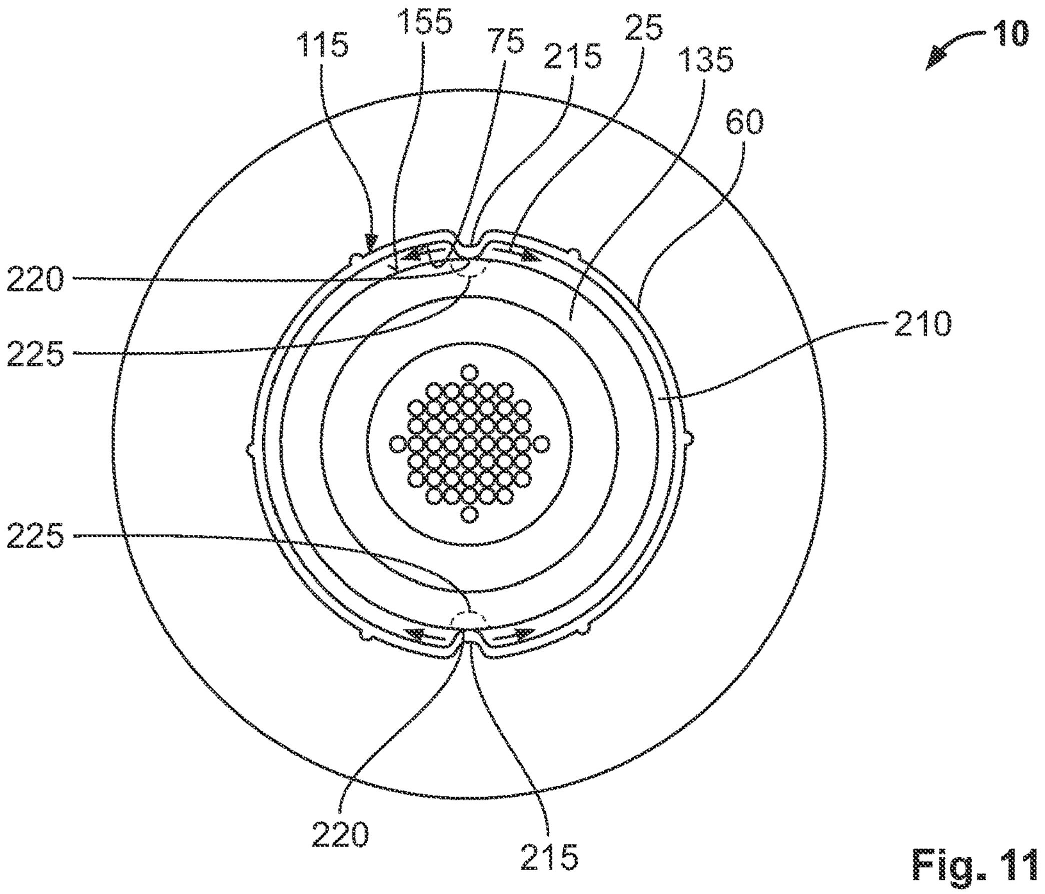
FIG. 11 is a sectional front view of the arrangement, taken along plane B-B of FIG. 10.

An arrangement 10 according to a second embodiment is shown in FIGS. 10 and 11. The arrangement 10 is substantially identical to the arrangement 10 explained in FIGS. 1 to 9. In the following, only the differences between the arrangement 10 shown in FIG. 10 and the arrangement 10 described in FIGS. 1 to 9 is discussed.

The arrangement 10 shown in FIG. 10 additionally has at least one third impress 215 in the crimp barrel 60, as shown in FIGS. 10 and 11. The third impress 215 is narrower along axis 30 than, for example, the first or second impress 115, 120. The third impress 215 in this case may also be stamped into the first impress 115 and/or the second impress 120. The third impress 215 is realized, for example, so as to be radially deeper than the first and/or second impress 115, 120. In addition, the third impress 215 is narrower in the circumferential direction than the first and/or second impress 115, 120. The third impress 215 in this case may be elongate.

Provided as an example in the embodiment shown in FIGS. 10 and 11, there are two third impresses 215, which are offset from each other in the circumferential direction by, for example, 180°. A different number of third impresses 215 may also be provided. The third impress 215 can be positioned offset circumferentially from the protuberance 130.

The third impress 215 is shaped, as an example, in such a manner that the third impress 215 forms a convexity 220 on the first inner circumferential side 75. The convexity 220 lies against the third outer circumferential side 155 and projects through the annular gap 210. Upon the third impress 215 being stamped into the crimp barrel 60, the convexity 220 displaces the first electric conductor 25 in the circumferential direction (represented symbolically in FIG. 11 by arrows). In an embodiment, upon the third impress 215 being stamped into the crimp barrel 60, a fourth impress 225 (indicated by dashed lines in FIG. 11) is stamped into the connection portion 135 by the convexity 220, the convexity 220 engaging in the fourth impress 225, such that, in addition to a frictional connection between the convexity 220 and the third outer circumferential side 155, the crimp barrel 60 realizes a positive connection by the engagement of the convexity 220 in the fourth impress 225.

Figure 12:
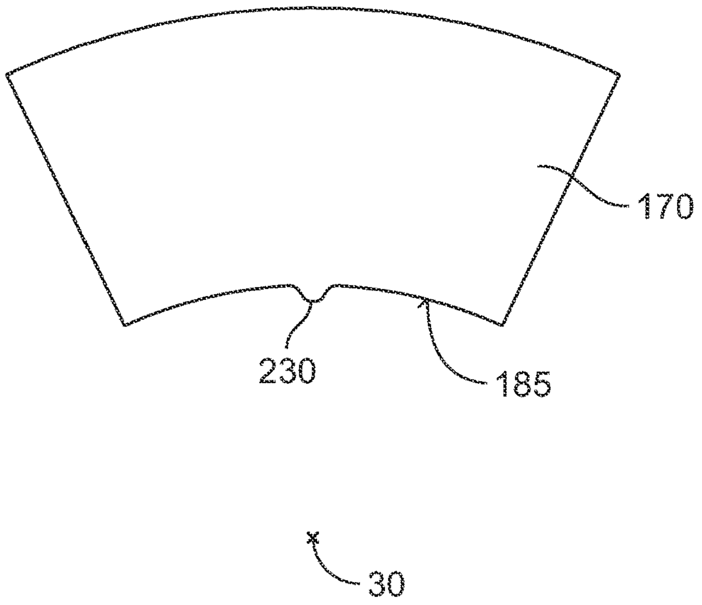
FIG. 12 is a front view of a tool for producing the arrangement of FIG. 11.

FIG. 12 shows the first pressing jaw 170 of tool 165, in a further development of the tool shown in FIGS. 6 and 7. The tool 165 is designed to realize the arrangement 10 shown in FIGS. 10 and 11. The second pressing jaw 175 is essentially identical to the second pressing jaw 175 shown in FIGS. 6 and 7. In the following, only the differences between the first pressing jaw 170 shown in FIG. 12 and the first pressing jaw 170 shown in FIGS. 6 and 7 are discussed.

On the first pressing surface 185, the first pressing jaw 170 has a shaping 230 shown in FIG. 12, which projects radially inwards over the first pressing surface 185, which in the embodiment extends on the circular path 185, 200 around the axis 30. The shaping 230 may be, for example, elongate in the direction parallel to the axis 30 and in its direction of main extent may extend substantially along the axis 30. The shaping 230 is designed to correspond to the third impress 215. Consequently the shaping 230 is shorter than the first pressing jaw 170 in a direction parallel to axis 30.

The method for producing the arrangement 10 is realized in a manner that is substantially identical to that of the method described in FIG. 8. In addition, in the eighth method step 335, simultaneously with the stamping-in of the first impress 115 by the first pressing surface 185, the third impress 215 is also stamped into the crimp barrel 60, and the convexity 220 is shaped, or stamped-in concomitantly. The shaping 230 in this case may project inwards in a radial direction to such an extent that the shaping 230 likewise shapes/stamps the fourth impress 225 into the connection portion 135 and positively secures the crimp barrel 60 to the connection portion 135.

Figure 13:
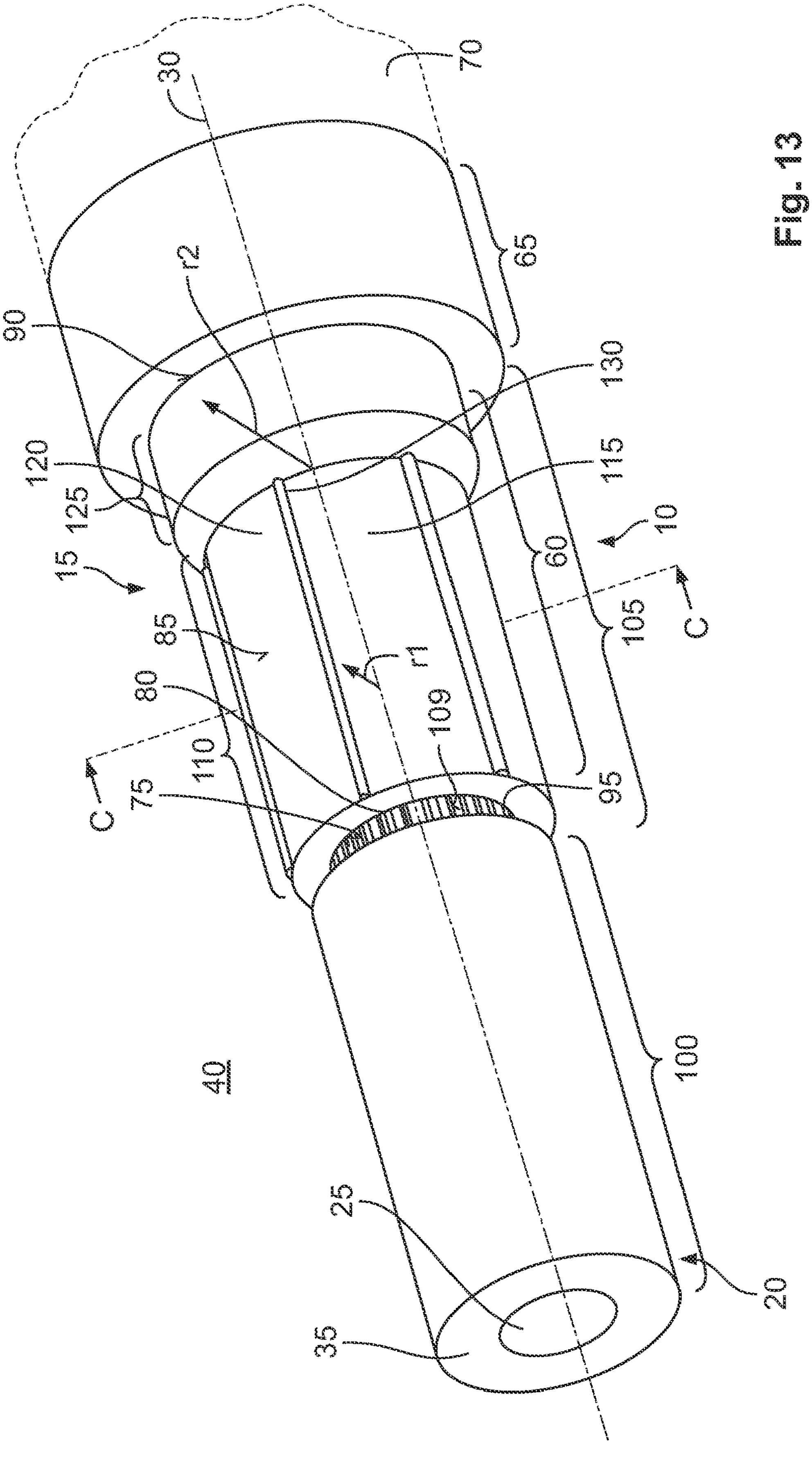
FIG. 13 is a perspective view of an arrangement according to a third embodiment.
Figure 14:
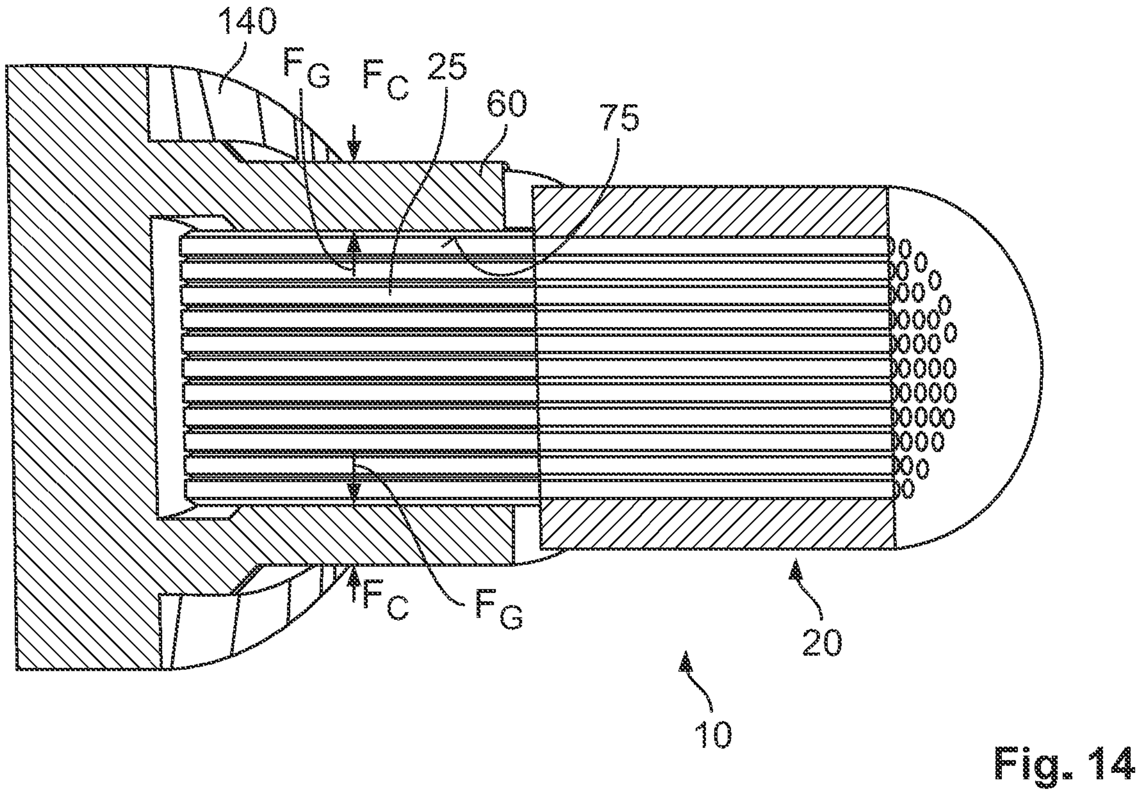
FIG. 14 is a sectional perspective view of the arrangement of FIG. 13.

An arrangement 10 according to a third embodiment is shown in FIGS. 13 and 14. The arrangement 10 is substantially identical to the arrangements 10 shown in FIGS. 1 to 12. In the following, only the differences between arrangement 10 shown in FIG. 13 and arrangement 10 shown in FIGS. 1 to 9 are discussed.

In comparison with the design shown in FIGS. 1 to 9, for example, the electric cable 20 is realized with only the first electric conductor 25 in the embodiment shown in FIG. 13. The first electric conductor 25 serves, for example, to transmit electrical energy between two components. The first electric conductor 25 in this case serves to transmit power, i.e. an electric current that is transmitted by the first electric conductor 25 is at least 1 A, at least 5 A, at least 10 A, at least 20 A, at least 50 A, or at least 100 Å, and is less than 200 A, less than 400 A, or less than 500 A. The electric current to be transmitted is transmitted via the first electric conductor 25 for at least 5 seconds.

The first electric conductor 25 is arranged, for example, along axis 30 and, in an embodiment, has a cross-sectional area of at least 5 $mm^2$, at least 10 $mm^2$, at least 25 $mm^2$, or at least 50 $mm^2$, and less than 200 $mm^2$. The first electric conductor 25 in this case may be realized as a single wire or a fine or ultrafine wire, a plurality of individual wires being combined to form a bundle of wires. The individual wires run, for example, parallel to each other or are twisted together. The first electric conductor 25 is electrically insulated from the environment 40 by the sheathing 35.

In the embodiment, the connection portion 135 is omitted, the crimp barrel 60 in FIGS. 13 and 14 being realized in one piece with and of the same material as the contact portion 140. The contact portion 140 is realized, for example, in the form of a disc, the opening 150 in contact element 65 being omitted.

The method of production described in FIG. 8 is substantially likewise performed to produce the arrangement 10 shown in FIGS. 13 and 14. In the following, only the differences as compared to the method described in FIG. 8 are discussed.

In the third method step 310, the crimp barrel 60 and the contact element 65 are provided, in an uncrimped condition, in one piece and of the same material.

In the fourth method step 315, the first electric conductor 25 is inserted into contact element 65 to such an extent that it abuts the contact portion 140 at the end face, or is at a predefined distance from the contact portion 140.

The fifth and sixth method steps 320, 325 are omitted, and the seventh method step 330 is performed on the fourth method step 315, such that the tool 165 overlaps radially.

In an eighth method step 335 that follows the seventh method step 330, the guide element 180 in each case introduces the radially inwardly directed pressing force $F_C$ into the pressing jaws 170, 175. In addition, guide element 180 moves the pressing jaws 170, 175 from the radially outer first position to the radially inner second position. Each of the pressing jaws 170, 175 bears with the respective pressing surface 185, 190 flatly against the second outer circumferential side 109 of the crimp barrel 60.

As a result of the pressing force $F_C$ being introduced into the crimp barrel 60, the crimp barrel 60 is pressed onto the first electric conductor 25 in such a manner that the first inner circumferential side 75 fits closely against the first outer circumferential side 85 of the first electric conductor 25 and bears substantially flatly against it. The first pressing surface 185 and the geometrical design of the first pressing jaw 170 cause the first impress 115 to be stamped into the first outer circumferential side 85 by the pressing force $F_C$. Similarly, the second pressing jaw 175 stamps the second impress 120 into the first outer circumferential side 85 by the second pressing surface 190. In addition, the pressing force $F_C$ and the close fit of the first inner circumferential side 75 cause the individual wires of the first electric conductor 25 to be pressed together and compressed until the crimp barrel 60 and the first electric conductor 25 are sufficiently compressed. The counterforce $F_G$ necessary for pressing is provided by the first electric conductor 25.

Figure 15:
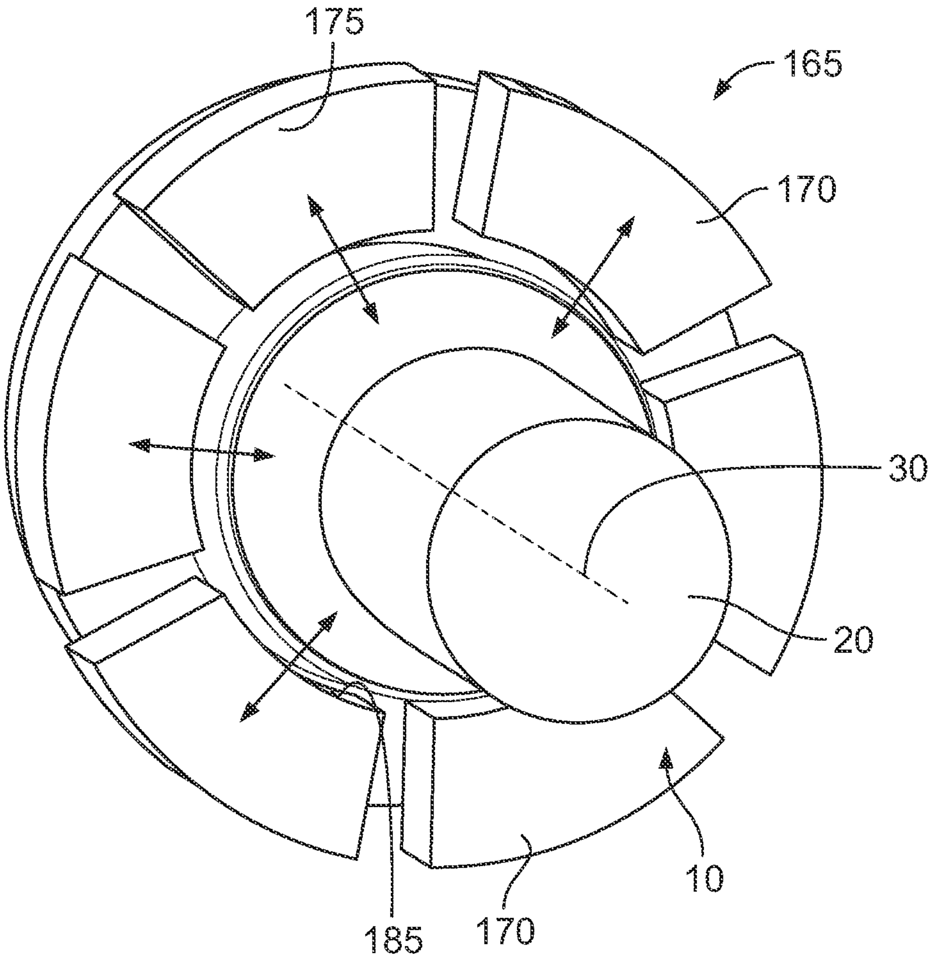
FIG. 15 is a perspective view of a tool according to another embodiment for producing the arrangement.

FIG. 15 shows a perspective representation of the arrangement 10 shown in FIGS. 1 to 9, and of a further development of the tool 165 shown in FIGS. 6 and 7. The tool 165 is substantially identical to the tool 165 shown in FIG. 6. Unlike the latter, the guide element 180 is realized in such a manner that all pressing jaws 170, 175 except the first pressing jaw 170 located at the bottom can be moved between the first radially outer position and the second radially inner position. The first pressing jaw 170 arranged at the bottom is fixed and not coupled to the guide element 180. The guide element 180 in this case is designed to move the other pressing jaws 170, 175 between the first radially outer and the second radially inner position in such a manner that the fixed first pressing jaw 170, with the first pressing surface 185, in each case remains in the first and second circular path 195, 200 as shown in FIG. 6. This has the result that, when the pressing jaws 170, 175 are being moved between the first radially outer position and the second radially inner position, the axis 30 is moved, in a direction perpendicular to the axis 30, in relation to the first non-movable first pressing jaw 170. This design has the advantage that the components for realizing the arrangement 10, i.e. the contact device 15 and the electric cable 20, can be placed on the non-movable of stationary first pressing jaw 170, thus preventing unwanted dislocation during stamping of the impresses 115, 120.

What is claimed is:

1. An arrangement for crimping a metal connector to an electric cable having a first electric conductor comprising:

a contact device having a crimp barrel formed of sheet metal and a contact element mechanically and electrically connected to the crimp barrel, the crimp barrel extending along an axis and having a first inner circumferential side and a first outer circumferential side, a first impress and a second impress stamped into a first sub-portion of the crimp barrel, the second impress is offset circumferentially from the first impress with respect to the axis, the crimp barrel having a protuberance extending over about 0.5° to 2° in the circumferential direction and disposed along the axis between the first impress and the second impress, the first impress and the second impress are each curved in the circumferential direction with respect to and about the axis and each have a length substantially greater than a length of the protuberance in the circumferential direction, each extending over about 20° to 60° in the circumferential direction with respect to the axis of the crimp barrel, the first inner circumferential side is crimped by the protuberance, the first impress and the second impress in such a manner that the first inner circumferential side is deformed by crimping forces and pressed against a second outer circumferential side of the first electric conductor and electrically contacts the second outer circumferential side, the first inner circumferential side fitting against the second outer circumferential side continuously about its circumference.

2. The arrangement of claim 1, wherein the first inner circumferential side has a circular cross-section with respect to the axis.

3. The arrangement of claim 1, wherein the crimp barrel has a greater maximum thickness of material at the protuberance in a radial direction than at the first impress and/or the second impress.

4. The arrangement of claim 1, wherein the electric cable has an electrically insulating intermediate layer and a second electric conductor, the electrically insulating intermediate layer circumferentially sheathing the second electric conductor and electrically insulating it from the first electric conductor, the first electric conductor is arranged outside the electrically insulating intermediate layer and sheaths the electrically insulating intermediate layer.

5. The arrangement of claim 4, wherein the contact element has an opening, the electrically insulating intermediate layer and the second electric conductor extend through the opening.

6. The arrangement of claim 1, wherein the contact element has a connection portion and a contact portion, the connection portion electrically and mechanically connected to the contact portion, the connection portion is a hollow cylinder.

7. The arrangement of claim 6, wherein the connection portion and the contact portion are formed in a single piece and made of a same material.

8. The arrangement of claim 6, wherein an annular gap is formed between the first inner circumferential side of the crimp barrel and the connection portion, the first electric conductor is arranged in the annular gap.

9. The arrangement of claim 8, wherein the crimp barrel has a third impress stamped into the crimp barrel and forming a convexity on the first inner circumferential side, a fourth impress is shaped into the connection portion by the convexity and the convexity engages the fourth impress in a positive connection.

10. The arrangement of claim 9, wherein the third impress defines a rounded cross section and extends in a direction of the axis of the crimp barrel, the rounded cross section includes a radially inward extending convex outer surface curved about an axis oriented parallel to the axis of the crimp barrel.

11. The arrangement of claim 10, wherein the third impress extends further radially inward than the first impress and the second impress.

12. The arrangement of claim 1, wherein the crimp barrel is continuous in the circumferential direction with respect to the axis.

13. The arrangement of claim 1, wherein the first inner circumferential side of the crimp barrel is uniformly circular.

14. The arrangement of claim 1, wherein the crimp barrel is continuous along its axial direction and about its circumference.

15. The arrangement of claim 1, wherein no protuberances are formed on the first inner circumferential side of the crimp barrel.

16. The arrangement of claim 1, wherein the first impress and the second impress cause the crimp barrel to be pressed onto the first electrical conductor in such a manner that the first inner circumferential side lies substantially flat against the second outer circumferential side.

17. The arrangement of claim 1, wherein the protuberance comprises a rib having a rounded cross section and extends in a direction of the axis of the crimp barrel.

18. The arrangement of claim 17, wherein the rounded cross section includes an outer convex surface curved about an axis oriented parallel to the axis of the crimp barrel.

* * * * *